Figure 1:
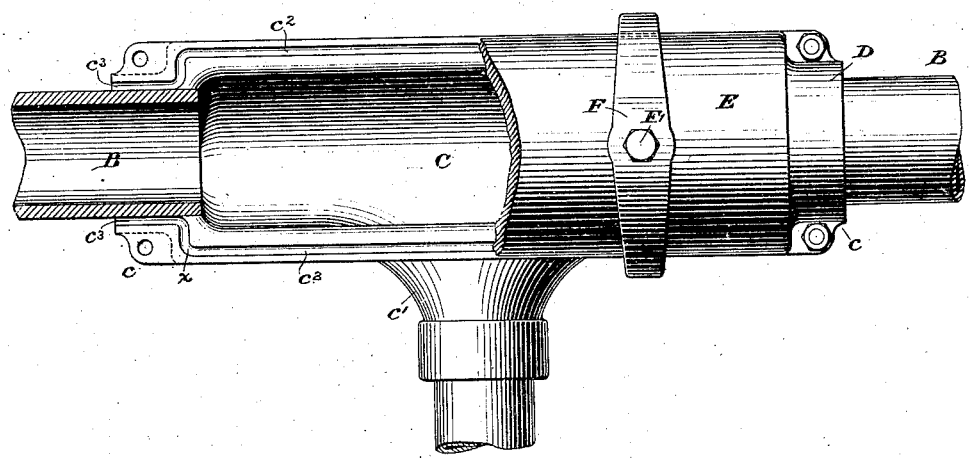

(No Model.) 2 Sheets—Sheet 1.

S. P. DENISON.
COUPLING BOX FOR ELECTRICAL CONDUITS.

No. 413,133. Patented Oct. 15, 1889.

Witnesses
Geo. W. Breck.
Henry W. Lloyd

Inventor
Sylvester P. Denison
By his Attorneys
Baldwin, Davidson & Wight.

(No Model.) 2 Sheets—Sheet 2.

S. P. DENISON.
COUPLING BOX FOR ELECTRICAL CONDUITS.

No. 413,133. Patented Oct. 15, 1889.

Witnesses
Geo. W. Breck.
Henry W. Lloyd.

Inventor
Sylvester P. Denison
By his Attorneys
Baldwin, Davidson & Wight

UNITED STATES PATENT OFFICE.

SYLVESTER P. DENISON, OF BROOKLYN, NEW YORK, ASSIGNOR TO GEORGE R. THOMPSON, OF PHILADELPHIA, PENNSYLVANIA.

COUPLING-BOX FOR ELECTRICAL CONDUITS.

SPECIFICATION forming part of Letters Patent No. 413,133, dated October 15, 1889.

Application filed July 27, 1889. Serial No. 318,916. (No model.)

*To all whom it may concern:*

Be it known that I, SYLVESTER P. DENISON, of Brooklyn, county of Kings, State of New York, have invented a new and Improved Coupling-Box for Electrical Conduit-Pipes, of which the following is a specification.

The invention is more especially designed to connect pipes or pipe ends in electrical conduits in which the cables or conductors are incased in metal pipes—such, for instance, as have been laid in the subways of New York city, where series of parallel iron pipes in quite close proximity, into which the cables are drawn, are buried in cement and extend from man-hole to man-hole.

The coupling was specially designed by me for use in practicing the method described below; but no claim is made herein to said method, as it forms the subject-matter of a divisional application filed by me September 21, 1889, No. 324,613.

The problem of practically making house or lateral connections with the conductors within the pipes has been a serious one. It has been proposed (and practiced to a certain extent) to lay at intervals lateral connection-boxes into which the pipes lead, and when wires are to be brought out for a house-connection the box must be located and reached. This is an objectionable method for several reasons: First, the first cost of such a conduit is excessively increased, since to make the system at all practicable a sufficient number of such boxes must be laid to meet prospective demands; second, the lateral connections can only be made at the points where boxes are located, and, third, in threading cables into the pipes the boxes form obstructions, and as several pipes usually lead into and out of a box the pilot-head is liable in leaving the box to enter the wrong pipe and lead the cable into it. All these objections are obviated by my method of making such connections, as I can connect at any point with any of the exposed or outer pipes of the bank or series forming the conduit.

I proceed as follows: At any point along the line of the conduit where it is desired to make a lateral connection with one or more of the pipes or cables I expose the desired pipe of the conduit, and by two longitudinal cuts and two transverse cuts extending around the pipe at the ends of the longitudinal cuts, made by means of any suitable tools, I cut out a short section of the pipe without cutting or injuring the covering of the inclosed cable. I then open the cable, bring out the desired conductors, make the lateral connections with them, and properly manipulate and treat the joint thus made in the sheath of the cable. This break in the continuity of the pipe is then bridged and the cable protected by a coupling formed in two longitudinal halves, one of which has a laterally-projecting tube, through which the lateral conductors running to the house are passed. The coupling being properly secured and packed, the cable is as thoroughly protected as if the pipe had not been cut, and the coupling being of general tubular shape and constituting a prolongation or section of the conduit-pipe it offers no obstruction to the threading of a cable therein, and does not permit of the possibility of a cable being drawn into an adjoining pipe—a thing liable to occur with the ordinary coupling-boxes now in use, as above mentioned.

Figure 2:
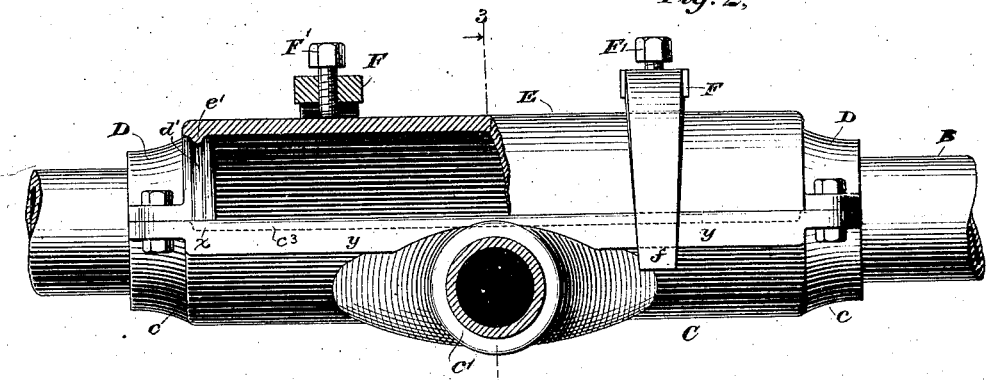
Figure 3:
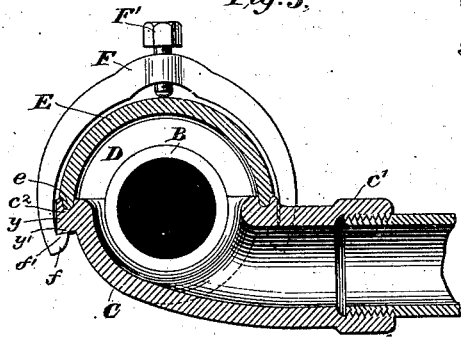
Figure 4:
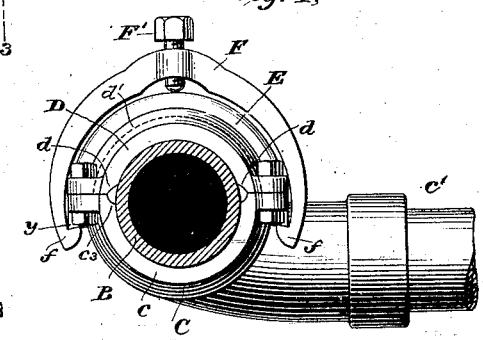
Figure 5:
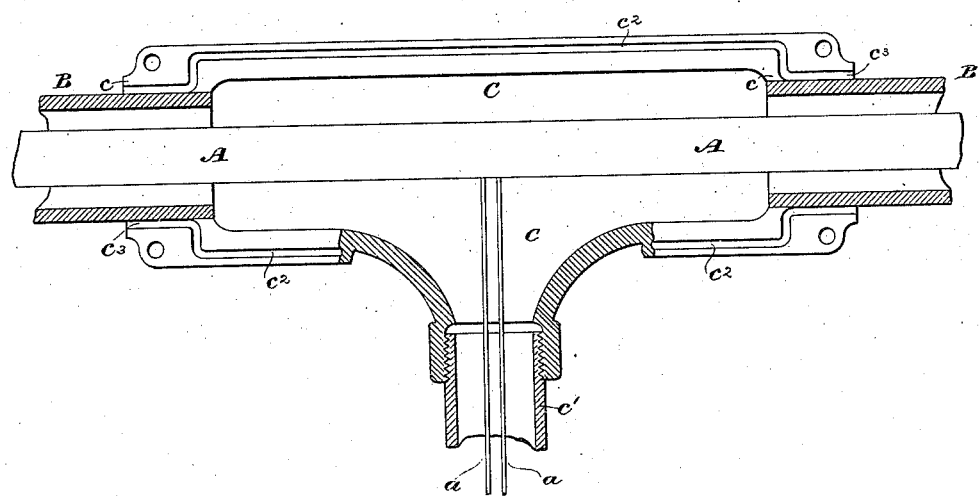

In the accompanying drawings, Figure 1 is a plan partly in section; Fig. 2, an elevation partly in section; Fig. 3, a transverse section on the line 3 3 of Fig. 2; Fig. 4, an end view showing the conduit-pipe in section; and Fig. 5, a diagram view indicating the ends of a conduit-pipe from which a section has been cut, the inclosed cable, the coupling, and the lateral connections leading therefrom through the passage in the side of the coupling.

A indicates the cable; *a a*, the lateral or house connections leading therefrom, and B B the ends of a conduit-pipe, from which a section that is replaced by the coupling has been cut without injuring the cable, as above described.

The coupling consists of a lower section C, having semicircular ends *c*, in which the ends B B of the conduit-pipe lie, and a lateral projection or tube *c'*, through which the house-connections *a a* are passed. On each side the lower section C is formed with a longitudinal recess or packing-groove $c^2$, which at the semicircular ends $c$ runs along their inner edges, as seen at $c^3$ in Figs. 1 and 4. A half-collar D is placed over each end of the conduit-pipe and is bolted to the end $c$, so as to clamp the end of the pipe between them. This collar has a packing-groove $d$ along each edge, Fig. 4, corresponding with the grooves $c^3$. This joint is of course to be leaded or suitably packed to render it tight.

The exterior face of each collar D has formed in it transversely to the end of the pipe a packing-groove $d'$, which on each side runs into the groove $c^3$ in the lower section at $x$. The opening in this structure is now closed by a cover E, having on each side a longitudinal edge or rib $e$, fitting into the groove $c^3$, and on each end a transverse edge or rib $e'$, fitting into the groove $d'$. These grooves being puttied, cemented, or otherwise suitably packed, the cover E is securely clamped in place by any suitable means, but preferably in the following manner: Two clamps F, having inwardly-projecting hooks $f$ upon their ends, are slipped over the coupling, so that they hook under the flanges $y$ of the lower section C. Screw-bolts F' passing through the tops of the clamps bear upon the top of the cover E and firmly secure it. The edges $f'$ of the hooks $f$ and the under face $y'$ of the flange $y$ are inclined, as shown, so that they tend to draw the ends of the clamps inwardly.

Where the coupling is used for conduit-pipes laid comparatively closely in tiers or banks, the parts are of course so proportioned and the width of the flanges $y$ and hooked ends $f$ of the clamps is such as to permit the passage of the ends of the clamps between adjoining pipes.

I claim as my invention—

1. The combination, substantially as set forth, of the lower coupling-section, the half-collars bolted to the ends thereof, the cover fitting over the lower section and half-collars, and clamping devices for securing the cover.

2. The combination, substantially as set forth, with the cover and clamping devices for securing it in place, of the remaining portion of the coupling upon which the cover lies, comprising a lower section and rings or collars at the ends thereof for embracing the ends of the pipes, said coupling having a lateral passage, for the purpose described.

3. The combination, substantially as set forth, of the lower section having the lateral passage for house-connections, semicircular ends, and packing-grooves, the half-collars having the transverse packing-grooves, the cover, and clamping devices for securing the cover in place.

4. The combination, substantially as set forth, with the cover and clamping devices for securing it in place, of the remaining portion of the coupling upon which a cover lies, comprising a lower section and sectional rings or collars at the ends thereof for embracing the ends of the pipes, said coupling having a lateral passage, for the purpose described.

In testimony whereof I have hereunto subscribed my name.

SYLVESTER P. DENISON.

Witnesses:
EDWARD C. DAVIDSON,
H. R. DE MOYA.